United States Patent
Yoshida et al.

(10) Patent No.: US 11,440,990 B2
(45) Date of Patent: *Sep. 13, 2022

(54) EPOXY RESIN, EPOXY RESIN COMPOSITION, EPOXY RESIN CURED PRODUCT, AND COMPOSITE MATERIAL

(71) Applicant: Showa Denko Materials Co., Ltd., Tokyo (JP)

(72) Inventors: Yuka Yoshida, Tokyo (JP); Naoki Maruyama, Tokyo (JP); Tomoko Higashiuchi, Tokyo (JP); Kazumasa Fukuda, Tokyo (JP); Keiichiro Nishimura, Tokyo (JP); Yoshitaka Takezawa, Tokyo (JP)

(73) Assignee: Showa Denko Materials Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/651,039

(22) PCT Filed: Sep. 29, 2017

(86) PCT No.: PCT/JP2017/035659
§ 371 (c)(1),
(2) Date: Mar. 26, 2020

(87) PCT Pub. No.: WO2019/064545
PCT Pub. Date: Apr. 4, 2019

(65) Prior Publication Data
US 2020/0247943 A1     Aug. 6, 2020

(51) Int. Cl.
*C08K 3/04* (2006.01)
*C08G 59/68* (2006.01)
*C08G 59/62* (2006.01)
*C08G 59/18* (2006.01)
*C08G 59/24* (2006.01)

(52) U.S. Cl.
CPC ......... *C08G 59/245* (2013.01); *C08G 59/184* (2013.01); *C08G 59/621* (2013.01); *C08G 59/688* (2013.01); *C08K 3/04* (2013.01)

(58) Field of Classification Search
CPC .. C08G 59/245; C08G 59/184; C08G 59/621; C08G 59/688; C08K 3/04
USPC ...................................................... 528/403
See application file for complete search history.

(56) References Cited

U.S. PATENT DOCUMENTS

2003/0229159 A1* 12/2003 Akatsuka ............... C08G 59/02
                                                523/457
2017/0349695 A1* 12/2017 Katagi ....................... C08J 5/18

FOREIGN PATENT DOCUMENTS

| CN | 107108856 A | 8/2017 |
|----|---|---|
| EP | 3239206 A1 | 11/2017 |
| EP | 3514190 A1 | 7/2019 |
| EP | 3514191 A1 | 7/2019 |
| EP | 3527604 A1 | 8/2019 |
| JP | 2010-1427 A | 1/2010 |
| JP | 2013-227451 A | 11/2013 |
| JP | 2015-203086 A | 11/2015 |
| WO | WO-2016/104772 A1 | 6/2016 |
| WO | WO-2017/145411 A1 | 8/2017 |

* cited by examiner

*Primary Examiner* — David T Karst
(74) *Attorney, Agent, or Firm* — Faegre Drinker Biddle & Reath LLP

(57) ABSTRACT

An epoxy resin, comprising an epoxy compound having at least two mesogenic structures and at least one divalent biphenyl group.

13 Claims, No Drawings

EPOXY RESIN, EPOXY RESIN COMPOSITION, EPOXY RESIN CURED PRODUCT, AND COMPOSITE MATERIAL

TECHNICAL FIELD

The invention relates to an epoxy resin, an epoxy resin composition, an epoxy resin cured product, and a composite material.

BACKGROUND ART

Epoxy resin is highly heat-resistant and is used in various applications. Recently, epoxy resin having improved heat conductivity has been considered in view of a trend toward increasing the operation temperature of power devices in which epoxy resin is used, and the like.

It is known that a cured product of epoxy resin that includes an epoxy compound having a mesogenic structure (hereinafter, also referred to as a mesogen-containing epoxy resin) exhibits excellent heat conductivity and fracture toughness. However, the mesogen-containing epoxy resin tends to have a higher viscosity as compared with other epoxy resins, and may not have sufficient fluidity during processing.

As a method for improving the fluidity of a mesogen-containing epoxy resin, there is a method of adding a solvent to lower the viscosity. In addition, a technique of using an epoxy compound having a specific molecular weight that is obtained by reacting an epoxy monomer having a mesogenic structure with a divalent phenol compound (see, for example, Patent Document 1).

PRIOR ART DOCUMENT

Patent Document

[Patent Document 1] International Publication No. WO 2016-104772

SUMMARY OF THE INVENTION

Problem to be Solved by the Invention

The method of adding a solvent to a mesogen-containing epoxy resin may cause formation of voids during curing and affect the product quality. The mesogen-containing epoxy resin described in Patent Document 1 achieves a lowered softening point, but still has high viscosity and needs to be improved from the viewpoint of ease of handling. In addition, further improvement in fracture toughness of a cured product of the epoxy resin is desired.

In view of the foregoing, the invention aims to provide an epoxy resin and an epoxy resin composition that exhibit excellent ease of handling and excellent fracture toughness in a cured state. The invention also aims to provide an epoxy resin cured product and a composite material obtained by using the epoxy resin or the epoxy resin composition.

Means for Solving the Problem

The means for solving the problem include the following embodiments.

<1> An epoxy resin, comprising an epoxy compound having at least two mesogenic structures and at least one divalent biphenyl group.

<2> The epoxy resin according to <1>, wherein the epoxy compound has a structure in which the divalent biphenyl group is disposed between the at least two mesogenic structures.

<3> The epoxy resin according to <1> or <2>, wherein at least one of the at least two mesogenic structures is a mesogenic structure represented by the following Formula (1):

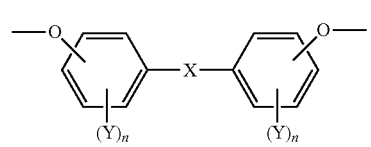

wherein, in Formula (1), X represents a single bond or a linking group that includes at least one divalent group selected from the following Group (A); each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; and each n independently represents an integer from 0 to 4:

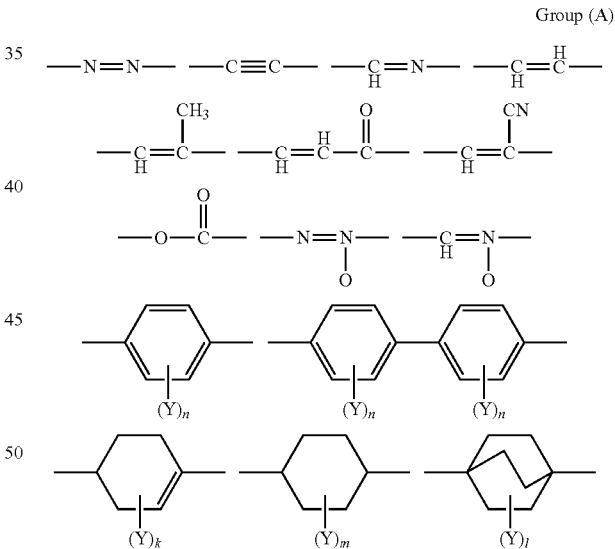

wherein, in Group (A), each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; k represents an integer from 0 to 7; m represents an integer from 0 to 8; and l represents an integer from 0 to 12.

<4> The epoxy resin according to <3>, wherein the structure represented by Formula (1) is a structure represented by the following Formula (2):

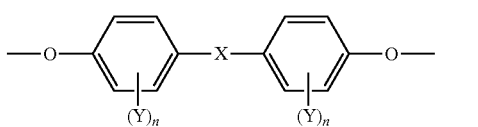

(2)

wherein, in Formula (2), X represents a single bond or a linking group that includes at least one divalent group selected from Group (A); each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; and each n independently represents an integer from 0 to 4.

<5> The epoxy resin according to <3> or <4>, wherein the epoxy compound comprises an epoxy compound having a structure represented by the following Formula (1-A):

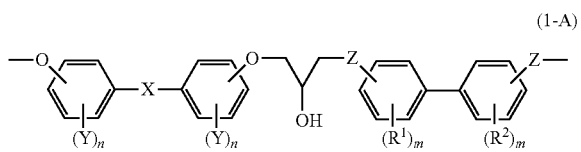

(1-A)

wherein, in Formula (1-A), X represents a single bond or a linking group that includes at least one divalent group selected from Group (A); each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; each Z independently represents —O— or —NH—; each of $R^1$ and $R^2$ independently represents an alkyl group having 1 to 8 carbon atoms; and each m independently represents an integer from 0 to 4.

<6> The epoxy resin according to <5>, wherein the epoxy compound having a structure represented by Formula (1-A) comprises an epoxy compound having a structure represented by the following Formula (2-A):

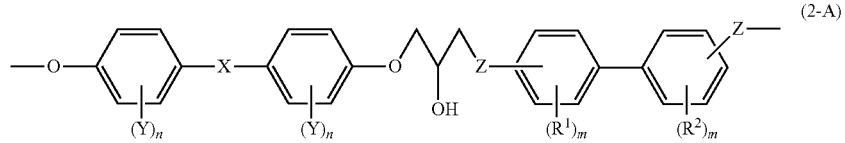

(2-A)

wherein, in Formula (2-A), X represents a single bond or a linking group that includes at least one divalent group selected from Group (A); each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; each Z independently represents —O— or —NH—; each of $R^1$ and $R^2$ independently represents an alkyl group having 1 to 8 carbon atoms; and each m independently represents an integer from 0 to 4.

<7> The epoxy resin according to any one of <1> to <6>, wherein at least one of the at least two mesogenic structures includes a structure represented by at least one selected from the group consisting of the following Formula (3) and Formula (4):

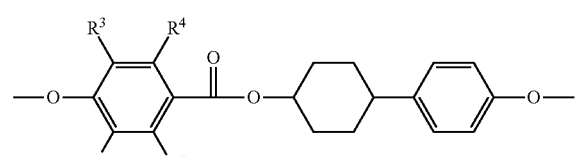

(3)

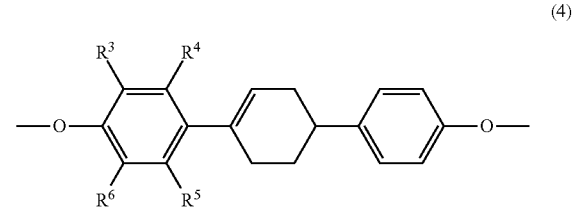

(4)

wherein, in Formula (3) and Formula (4), each of $R^3$ to $R^6$ independently represents a hydrogen atom or an alkyl group of 1 to 3 carbon atoms.

<8> The epoxy resin according to <7>, wherein the epoxy compound has a structure in which one divalent biphenyl group is disposed between two of the structures represented by Formula (3) or Formula (4).

<9> The epoxy resin according to <7> or <8>, wherein the epoxy compound includes an epoxy compound having a structure represented by at least one selected from the group consisting of the following Formula (3-A), Formula (3-B), Formula (4-A) and Formula (4-B):

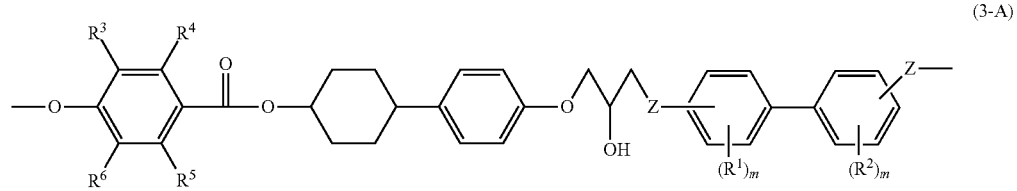

(3-A)

-continued

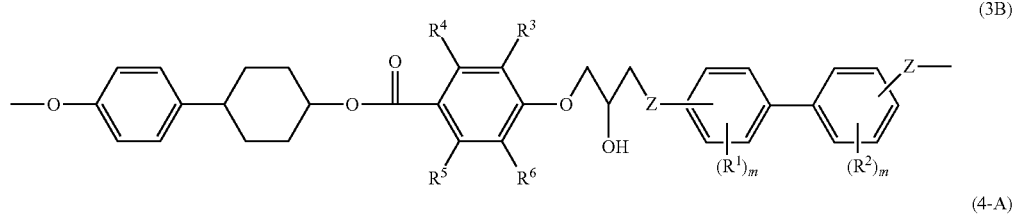
(3B)

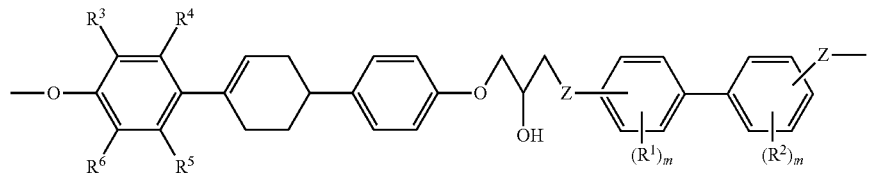
(4-A)

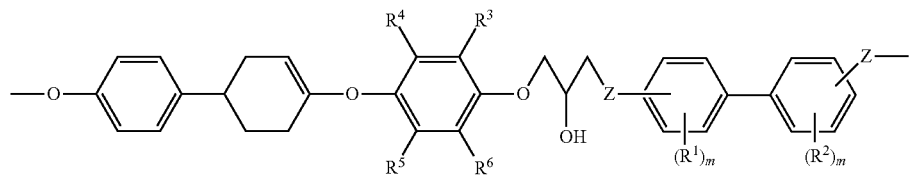
(4-B)

wherein, in Formula (3-A), Formula (3-B), Formula (4-A) and Formula (4-B), each Z independently represents —O— or —NH—; each of $R^1$ and $R^2$ independently represents an alkyl group of 1 to 8 carbon atoms; each m independently represents an integer from 0 to 4; and each of $R^3$ to $R^6$ independently represents a hydrogen atom or an alkyl group of 1 to 3 carbon atoms.

<10> The epoxy resin according to any one of <1> to <9>, further comprising a mesogenic epoxy monomer represented by the following Formula (1-m):

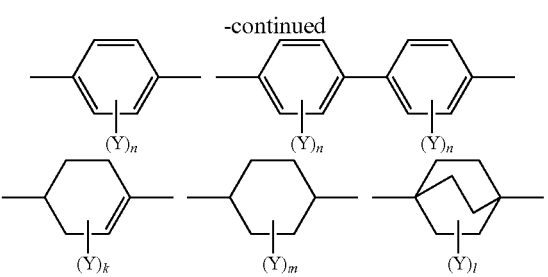
(1-m)

wherein, in Formula (1-m), X represents a single bond or a linking group that includes at least one divalent group selected from the following Group (A); each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; and each n independently represents an integer from 0 to 4:

Group (A)

—N=N—  —C≡C—  —C=N—  —C=C—
                        H        H  H

CH₃            O             CN
—C=C—   —C=C—C—   —C=C—
  H        H                    H

O
—O—C—   —N=N—   —C=N—
              |  |         |
              O  O         O

-continued

[structures with (Y)ₙ, (Y)ₙ, (Y)ₙ, (Y)ₖ, (Y)ₘ, (Y)ₗ]

wherein, in Group (A), each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; k represents an integer from 0 to 7; m represents an integer from 0 to 8; and l represents an integer from 0 to 12.

<11> The epoxy resin according to <10>, wherein the mesogenic epoxy monomer represented by Formula (1-m) includes a mesogenic epoxy monomer represented by the following Formula (2-m):

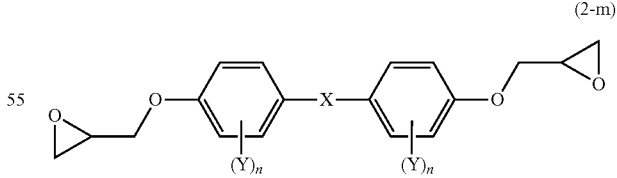
(2-m)

wherein, in Formula (1-m), X represents a single bond or a linking group that includes at least one divalent group selected from the Group (A); each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; and each n independently represents an integer from 0 to 4.

<12> The epoxy resin according to <10>, wherein the mesogenic epoxy monomer represented by Formula (1-m) includes a mesogenic epoxy monomer represented by the following Formula (3-m) or Formula (4-m):

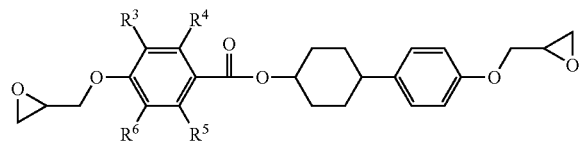

(3-m)

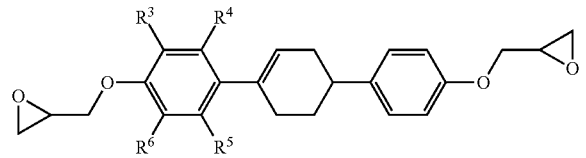

(4-m)

wherein, in Formula (3-m) and Formula (4-m), each of $R^3$ to $R^6$ independently represents a hydrogen atom or an alkyl group of 1 to 3 carbon atoms.

<13> The epoxy resin according to any one of <10> to <12>, wherein the mesogenic epoxy monomer is included in an amount of 50% or less with respect to a total amount of the epoxy resin.

<14> An epoxy resin composition, comprising the epoxy resin according to any one of <1> to <13>, and a curing agent.

<15> The epoxy resin composition according to <14>, which is configured to form a smectic structure in a cured state.

<16> The epoxy resin composition according to <14> or <15>, wherein the curing agent includes a compound having two or more amino groups that are directly bonded to an aromatic ring.

<17> The epoxy resin composition according to any one of <14> to <16>, wherein the curing agent is 3,3'-diaminodiphenylsulfone.

<18> An epoxy resin cured product, comprising a cured product of the epoxy resin composition according to any one of <14> to <17>.

<19> A composite material, comprising the epoxy resin cured product according to <18> and a reinforcing material.

<20> The composite material according to <19>, wherein the reinforcing material includes a carbon material.

Effects of the Invention

According to the invention, an epoxy resin and an epoxy resin composition that exhibit excellent ease of handling and excellent fracture toughness in a cured state are provided. Further, an epoxy resin cured product and a composite material obtained by using the epoxy resin or the epoxy resin composition are provided.

Embodiments for Implementing the Invention

In the following, embodiments for implementing the invention are explained. However, the invention is not limited to the embodiments. The elements of the embodiments (including steps) are not essential, unless otherwise stated. Further, numbers and numerical ranges do not limit the invention.

In the disclosure, the "process" refers not only to a process that is independent from the other steps, but also to a step that cannot be clearly distinguished from the other steps, as long as the aim of the process is achieved.

In the disclosure, the numerical range represented by "A to B" includes A and B as a minimum value and a maximum value, respectively.

In the disclosure, when numerical ranges are described in a stepwise manner, the values of the upper or lower limit of each numerical range may be substituted by the values of the upper or lower limit of the other numerical range, or may be substituted by the values described in the Examples.

In the disclosure, when there are more than one kind of substance corresponding to a component of a composition, the content of the component refers to a total content of the substances, unless otherwise stated.

In the disclosure, when there are more than one kind of particles corresponding to a component of a composition, the particle size of the component refers to a particle size of a mixture of the more than one kind of particles.

In the disclosure, the epoxy compound refers to a compound having an epoxy group in its molecule. The epoxy resin refers to a collective concept of epoxy compounds that are not in a cured state.

<Epoxy Resin>

The epoxy resin of the disclosure includes an epoxy compound having at least two mesogenic structures and at least one divalent biphenyl group (hereinafter, also referred to as a specific epoxy compound).

In the disclosure, when the mesogenic structure includes a biphenyl structure, the biphenyl structure is not regarded as the "divalent biphenyl group". The epoxy resin may include a single kind of specific epoxy resin, or may include two or more kinds thereof.

The mesogenic structure refers to a structure of an epoxy compound that is included in an epoxy resin that is capable of exhibiting liquid crystallinity.

Examples of the mesogenic structure of the specific epoxy compound include a biphenyl structure, a phenyl benzoate structure, a cyclohexyl benzoate structure, an azobenzene structure, a stilbene structure, a terphenyl structure, an anthracene structure, derivatives of these structures, and a structure in which two or more of these structures are linked via a linking group.

An epoxy resin including an epoxy compound having a mesogenic structure forms, in a cured product, a higher-order structure. In the disclosure, the higher-order structure refers to a structure in which structural elements are arranged to form a micro-and-organized structure. Examples of the higher-order structure include a crystalline phase and a liquid crystalline phase, and existence thereof can be determined with a polarizing microscope. Specifically, existence of a higher-order structure can be determined by whether or not an interference pattern due to depolarization is observed under crossed Nicols. A higher-order structure generally exists in a cured product of an epoxy resin composition and forms a domain structure in the form of an island, wherein each island corresponds to a higher-order structure. The structural elements of the higher-order structure are generally formed by covalent bonding.

Examples of a higher-order structure formed in a cured product include a nematic structure and a smectic structure, which are a liquid crystal structure, respectively. The nematic structure is a liquid crystal structure that has only an orientational order in which molecules are arranged in one direction. The smectic structure is a liquid crystal structure that has a one-dimensional order in addition to an orientational order, and forms a lamellar structure. The degree of order is higher in a smectic structure than in a nematic structure. Therefore, a smectic structure is preferred in terms of thermal conductivity and fracture toughness of a cured product.

Whether or not a smectic structure is formed in a cured product of the epoxy resin can be determined by X-ray diffraction measurement by using, for example, an X-ray diffractometer from Rigaku Corporation. When the measurement is performed using CuKα1 line under a tube voltage of 40 kV, a tube current of 20 mA and a measurement range 2θ=2° to 30°, and a diffraction peak is observed in a range of 2θ=2° to 10°, it is determined that a smectic structure is formed in a cured product.

The mesogenic structure of the specific epoxy compound may be a structure represented by the following Formula (1).

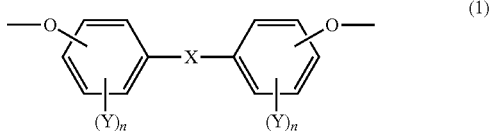

(1)

In Formula (1), X represents a single bond or a linking group that includes at least one divalent group selected from the following Group (A). Each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; and each n independently represents an integer from 0 to 4.

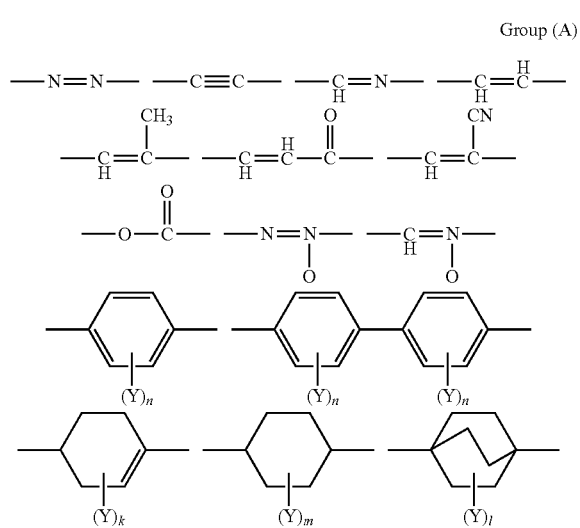

Group (A)

In Group (A), each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; k represents an integer from 0 to 7; m represents an integer from 0 to 8; and l represents an integer from 0 to 12.

The research conducted by the inventors has found that an epoxy resin including a specific epoxy compound is more likely to reduce the viscosity as the temperature is increased, and is easier to handle, as compared with an epoxy resin including a compound obtained by reaction of an epoxy monomer having a mesogenic structure and a divalent phenol compound (i.e., an epoxy compound having a phenylene group in the molecule) as described in Patent Document 1. The reason for this is not exactly clear, but it is considered to be that a degree of molecular motion of the specific epoxy compound, including a divalent biphenyl group, is greater than that of an epoxy compound including a phenylene group, due to the greater molecular weight.

(Specific Epoxy Compound)

The structure of the specific epoxy compound is not particularly limited, as long as at least two mesogenic structures represented by Formula (1) and at least one divalent biphenyl group are included therein.

The at least two mesogenic structures included in the same molecule of the specific epoxy compound represented by Formula (1) may be the same or different from each other.

In the mesogenic structure represented by Formula (1), when X is at least one linking group selected from the divalent groups in Group (A), X is preferably at least one linking group selected from the divalent groups included in the following Group (Aa); more preferably a linking group that is selected from the divalent groups included in the following Group (Aa) and has a ring structure.

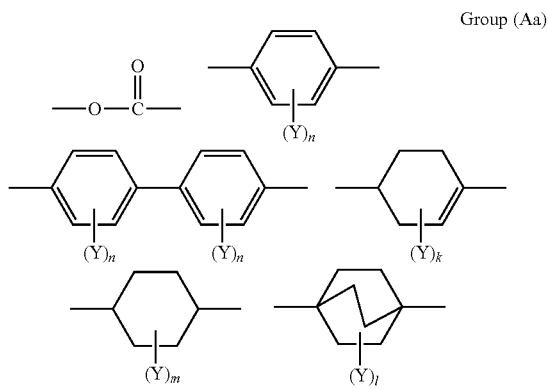

Group (Aa)

In Group (Aa), each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; k represents an integer from 0 to 7; m represents an integer from 0 to 8; and l represents an integer from 0 to 12.

It is preferred that at least one of the mesogenic structures, included in at least one of epoxy compound A or epoxy compound B, is a mesogenic structure represented by the following Formula (2); and it is more preferred that all of mesogenic structures, included in at least one of epoxy compound A or epoxy compound B, are a mesogenic structure represented by the following Formula (2).

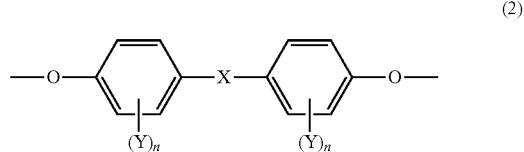

(2)

In Formula (2), definitions and preferred examples of X, Y and n are the same as the definitions and preferred examples of X, Y and n in Formula (1).

It is preferred that at least one of the mesogenic structures represented by Formula (1) included in the specific epoxy compound is a mesogenic structure represented by the following Formula (3) or Formula (4); and it is more preferred that all of the mesogenic structures represented by Formula (1) included in the specific structure are a mesogenic structure represented by the following Formula (3) or Formula (4).

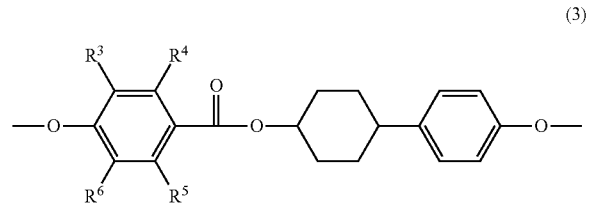

(3)

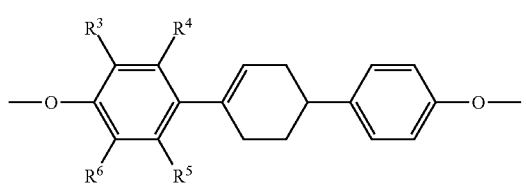

(4)

In Formula (3) and Formula (4), each of $R^3$ to $R^6$ independently represents a hydrogen atom or an alkyl group having 1 to 3 carbon atoms.

Each of $R^3$ to $R^6$ is preferably independently a hydrogen atom or an alkyl group having 1 or 2 carbon atoms, more preferably a hydrogen atom or a methyl group, further preferably a hydrogen atom. The number of hydrogen atoms represented by $R^3$ to $R^6$ is preferably 2 to 4, more preferably 3 or 4, further preferably 4. When any one of $R^3$ to $R^6$ is an alkyl group having 1 to 3 carbon atoms, at least one of $R^3$ or $R^6$ is preferably an alkyl group having 1 to 3 carbon atoms.

Examples of the divalent biphenyl group included in the specific epoxy compound include a structure represented by the following Formula (5).

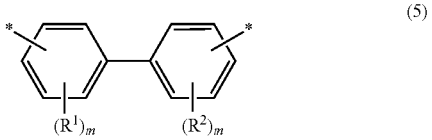

(5)

In Formula (5), * represents a bonding site to an adjacent atom. Examples of the adjacent atom include an oxygen atom and a nitrogen atom. Each of $R^1$ and $R^2$ independently represents a monovalent alkyl group having 1 to 8 carbon atoms. Each m independently is an integer from 0 to 4.

Each of $R^1$ and $R^2$ independently represents a alkyl group having 1 to 8 carbon atoms, more preferably an alkyl group having 1 to 3 carbon atoms, further preferably a methyl group.

Each m independently preferably an integer from 0 to 2, more preferably 0 or 1, further preferably 0.

Among the structures represented by Formula (5), a structure represented by the following Formula (5a) is preferred. A specific epoxy compound having a structure represented by Formula (5a) tends to have a linear molecular structure, and therefore, it is considered to have a high degree of molecular stacking property and easier to form a higher-order structure.

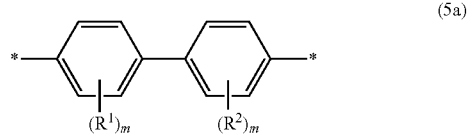

(5a)

In Formula (5a), definitions and preferred examples of *, $R^1$, $R^2$ and m are the same as the definitions and preferred examples of *, $R^1$, $R^2$ and m in Formulae (5).

The specific epoxy compound preferably has a structure in which one divalent biphenyl is disposed between two mesogenic structures represented by Formula (1).

Specific embodiments of the "structure in which one divalent biphenyl group is disposed between two mesogenic structures represented by Formula (1)" is not particularly limited. For example, the structure may be a structure in which an epoxy group of a compound, which has a mesogenic structure and an epoxy group, is reacted with a functional group capable of reacting with an epoxy group of an epoxy compound, which has a biphenyl group and the functional group.

It is more preferred that the specific epoxy compound has a structure in which one divalent biphenyl is disposed between two mesogenic structures represented by Formula (3) or Formula (4).

The specific epoxy compound may be an epoxy compound having a structure represented by the following Formula (1-A).

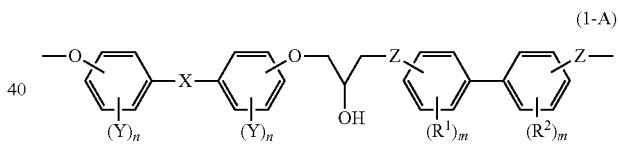

(1-A)

In Formula (1-A), definitions and preferred examples of X, Y and n are the same as the definitions and preferred examples of X, Y and n in Formula (1). Definitions and preferred examples of $R^1$, $R^2$ and m are the same as the definitions and preferred examples of $R^1$, $R^2$ and m in Formulae (5). Each Z independently represents —O— or —NH—.

In Formula (1-A), each of the benzene rings attached with $R^1$ or $R^2$ in Formula (1-A) preferably has 2 to 4 hydrogen atoms, more preferably 3 or 4 hydrogen atoms, further preferably 4 hydrogen atoms.

From the viewpoint of forming a higher-order structure, the epoxy compound having a structure represented by Formula (1-A) is preferably an epoxy compound having a structure represented by Formula (2-A).

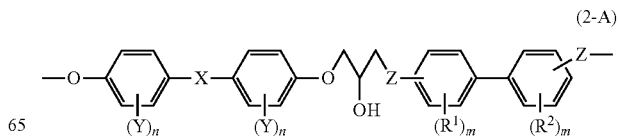

(2-A)

In Formula (2-A), definitions and preferred examples of X, Y, n, m, $R^1$, $R^2$ and Z are the same as the definitions and preferred examples of X, Y, n, m, $R^1$, $R^2$ and Z in Formula (1-A).

Examples of the epoxy compound having a structure represented by Formula (1-A) include an epoxy compound having a structure selected from the group consisting of the following Formulae (3-A), (3-B), (4-A) and (4-B).

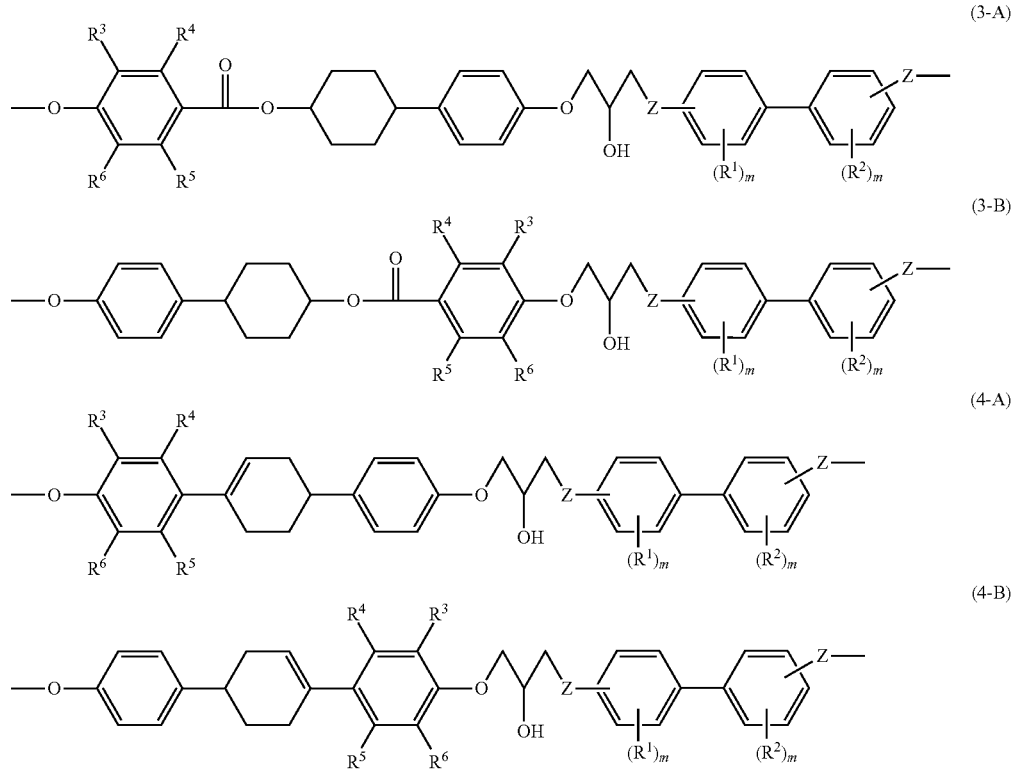

In Formulae (3-A), (3-B), (4-A) and (4-B), definitions and preferred examples of $R^3$ to $R^6$ are the same as the definitions and preferred examples of $R^3$ to $R^6$ in Formulae (3) and (4). Further, the definitions and preferred examples of $R^1$, $R^2$, m and Z are the same as the definitions and preferred examples of $R^1$, $R^2$, m and Z in Formula (1-A).

The number of the structure represented by Formula (1) in the specific epoxy compound is not particularly limited as long as it is two or more. From the viewpoint of reducing the viscosity, at least a part of the specific epoxy compound is preferably a compound having two of the structures represented by Formula (1) (dimer compound).

Examples of the specific epoxy compound as a dimer compound include a compound represented by the following Formula (1-A-A).

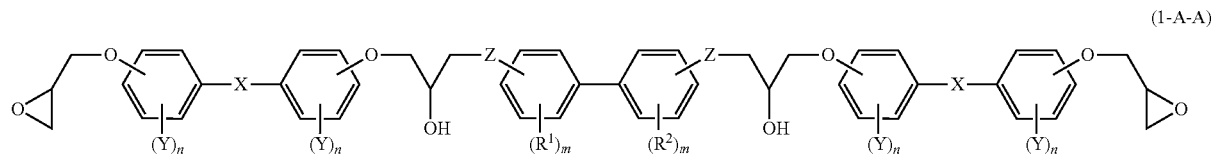

In Formula (1-A-A), definitions and preferred examples of X, Y, n, m, $R^1$, $R^2$ and Z are the same as the definitions and preferred examples of X, Y, n, m, $R^1$, $R^2$ and Z in Formula (1-A).

From the viewpoint of forming a higher-order structure, the epoxy compound having a structure represented by Formula (1-A-A) is preferably an epoxy compound having a structure represented by the following Formula (2-A-A).

(2-A-A)

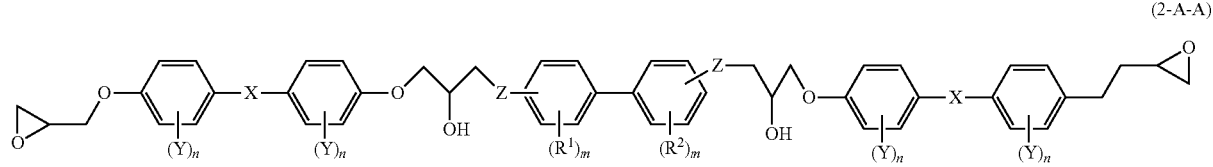

In Formula (2-A-A), definitions and preferred examples of X, Y, n, m, $R^1$, $R^2$ and Z are the same as the definitions and preferred examples of X, Y, n, m, $R^1$, $R^2$ and Z in Formula (1-A-A).

Further, the epoxy compound represented by Formula (1-A-A) include an epoxy compound having a structure represented by the following Formulae (3-A-A) to (3-A-C) and Formulae (4-A-A) to (4-A-C).

In Formulae (3-A-A) to (3-A-C) and Formulae (4-A-A) to (4-A-C), definitions and preferred examples of $R^3$ to $R^6$, $R^1$, $R^2$, m and Z are the same as the definitions and preferred examples of $R^3$ to $R^6$, $R^1$, $R^2$, m and Z in Formulae (3-A), (3-B), (4-A) and (4-B).

(Method of Synthesizing Specific Epoxy Compound)

The method of synthesizing a specific epoxy compound is not particularly limited. For example, the specific epoxy (3-A-A)

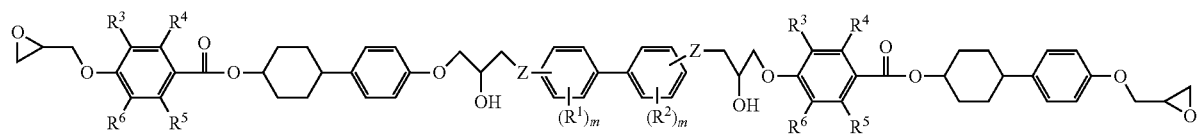

(3-A-B)

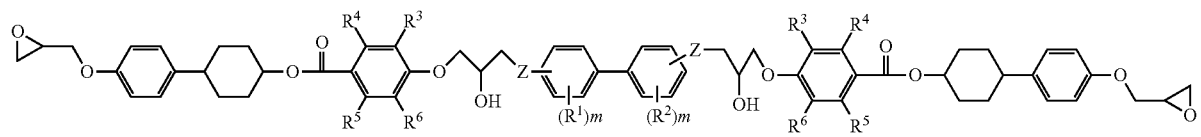

(3-A-C)

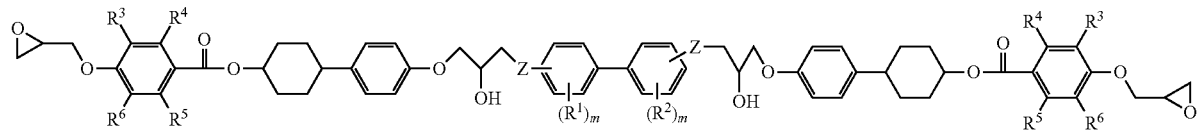

(4-A-A)

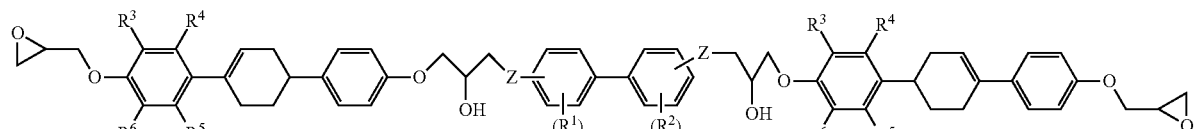

(4-A-B)

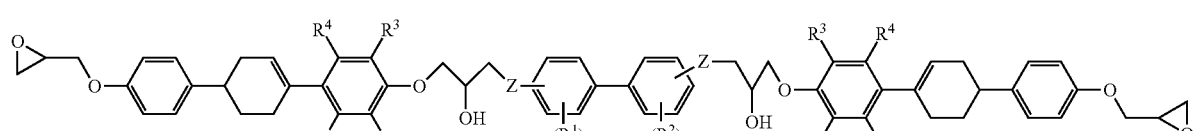

(4-A-C)

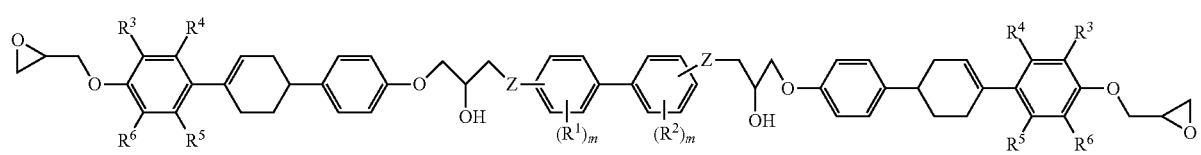

compound may be obtained by allowing a compound represented by the following Formula (1-m), hereinafter also referred to as a mesogenic epoxy monomer, to react with a biphenyl compound having a functional group that can react with the epoxy group of the mesogenic epoxy monomer.

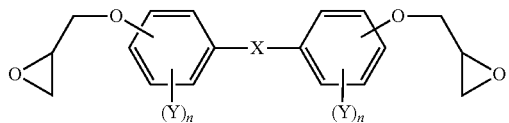

(1-m)

In Formula (1-m), definitions and preferred examples of X, Y and n are the same as the definitions and preferred examples of X, Y and n in the mesogenic structure of the specific epoxy compound represented by Formula (1).

From the viewpoint of forming a higher-order structure, the mesogenic epoxy monomer represented by Formula (1-m) is preferably a mesogenic epoxy monomer having a structure represented by the following Formula (2-m).

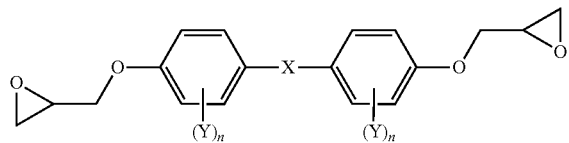

(2-m)

In Formula (2-m), definitions and preferred examples of X, Y and n are the same as the definitions and preferred examples of X, Y and n in Formula (1-m).

The mesogenic epoxy monomer represented by Formula (1-m) is more preferably a mesogenic epoxy monomer having a structure represented by the following Formula (3-m) or Formula (4-m).

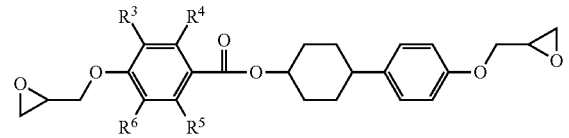

(3-m)

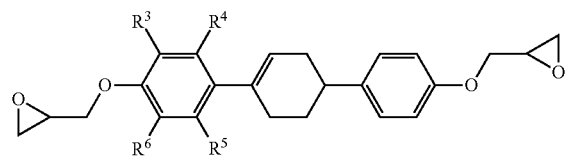

(4-m)

In Formula (3-m) and Formula (4-m), definitions and preferred examples of $R^3$ to $R^6$ are the same as the definitions and preferred examples of $R^3$ to $R^6$ in Formula (3) and Formula (4).

The method of reacting a mesogenic epoxy monomer and a biphenyl compound having a functional group that can react with an epoxy group of the mesogenic epoxy monomer is not specifically limited. Specifically, for example, the reaction can be performed by dissolving a mesogenic epoxy monomer and a biphenyl compound having a functional group that can react with an epoxy group of the mesogenic epoxy monomer, and optionally a reaction catalyst, in a solvent, and stirring the same while heating.

Alternatively, for example, the specific epoxy compound may be synthesized by mixing a mesogenic epoxy monomer and a biphenyl compound having a functional group that can react with an epoxy group of the mesogenic epoxy monomer, without using a solvent, and stirring the mixture while heating.

The solvent used for the synthesis is not particularly limited, as long as it can dissolve a mesogenic epoxy monomer and a biphenyl compound having a functional group that is capable of reacting with an epoxy group of the mesogenic epoxy monomer, and can be heated to a temperature required to cause reaction of the compounds. Specific examples of the solvent include cyclohexanone, cyclopentanone, ethyl lactate, propyleneglycol monomethyl ether, N-methyl pyrrolidone, methyl cellosolve, ethyl cellosolve, and propyleneglycol monopropyl ether.

The amount of the solvent is not particularly limited, as long as a mesogenic epoxy monomer and a biphenyl compound having a functional group that is capable of reacting with an epoxy group of the mesogenic epoxy monomer, and optionally a reaction catalyst, can be dissolved at a reaction temperature. Although the degree of solubility depends on the type of the raw materials, the solvent and the like, the viscosity of the solvent after the reaction tends to be in a preferred range when the solvent is used in an amount that adjusts an initial solid content concentration to be from 20% by mass to 60% by mass, for example.

The biphenyl compound having a functional group that is capable of reacting with an epoxy group of the mesogenic epoxy monomer is not particularly limited. From the viewpoint of forming a smectic structure in a cured product, the biphenyl compound is preferably at least one selected from the group consisting of a dihydroxybiphenyl compound, having a structure in which two hydroxy groups are bonded to each of the benzene rings that form a biphenyl structure, respectively; and a diaminobiphenyl compound, having a structure in which two amino groups are bonded to each of the benzene rings that form a biphenyl structure, respectively (hereinafter, also referred to as specific biphenyl compounds).

Examples of the dihydroxybiphenyl compound include 2,2'-dihydroxybiphenyl, 2,3'-dihydroxybiphenyl, 2,4'-dihydroxybiphenyl, 3,3'-dihydroxybiphenyl, 3,4'-dihydroxybiphenyl, 4,4'-dihydroxybiphenyl and derivatives thereof.

Examples of the diaminobiphenyl compound include 2,2'-diaminobiphenyl, 2,3'-diaminoibiphenyl, 2,4'-diaminobiphenyl, 3,3'-diaminobiphenyl, 3,4'-diaminobiphenyl, 4,4'-diaminobiphenyl and derivatives thereof.

Derivatives of the specific biphenyl compound include a specific biphenyl compound having a substitute, such as an alkyl group of from 1 to 8 carbon atoms, on the benzene ring. A single kind of the specific biphenyl compound may be used alone, or two or more kinds may be used in combination.

The type of the reaction catalyst is not particularly limited, and may be selected based on the reaction rate, reaction temperate, storage stability and the like. Specific examples of the reaction catalyst include an imidazole compound, an organic phosphorous compound, a tertiary amine compound and a quaternary ammonium salt. A single kind of the reaction catalyst may be used alone, or two or more kinds may be used in combination.

From the viewpoint of thermal resistance of a cured product, the reaction catalyst is preferably an organic phosphorous compound.

Preferred examples of the organic phosphorous compound include an organic phosphine compound; a compound having intermolecular polarization obtained by adding, to an organic phosphine compound, a compound having a π bond such as a maleic acid anhydride, a quinone compound, diazodiphenyl methane or a phenol resin; and a complex formed by an organic phosphine compound and an organic boron compound.

Specific examples of the organic phosphine compound include triphenylphosphine, diphenyl(p-tolyl)phosphine, tris(alkylphenyl)phosphine, tris(alkoxyphenyl)phosphine, tris(alkylalkoxyphenyl)phosphine, tris(dialkylphenyl)phosphine, tris(trialkylphenyl)phosphine, tris(tetraalkylphenyl)phosphine, tris(dialkoxyphenyl)phosphine, tris(trialkoxyphenyl)phosphine, tris(tetraalkoxyphenyl)phosphine, trialkylphosphine, dialkylarylphosphine and alkyldiarylphosphine.

Specific examples of the quinone compound include 1,4-benzoquinone, 2,5-toluquinone, 1,4-naphthoquinone, 2,3-dimethylbenzoquinone, 2,6-dimethylbenzoquinone, 2,3-dimethoxy-5-methyl-1,4-benzoquinone, 2,3-dimethoxy-1,4-benzoquinone, and phenyl-1,4-benzoquinone.

Specific examples of the organic boron compound include tetraphenyl borate, tetra-p-tolyl borate and tetra-n-butyl borate.

The amount of the reaction catalyst is not particularly limited. From the viewpoint of reaction rate and storage stability, the amount of the reaction catalyst is preferably from 0.1 parts by mass to 1.5 parts by mass, more preferably from 0.2 parts by mass to 1 part by mass, with respect to 100 parts by mass of the total amount of the mesogenic epoxy monomer and the compound having a functional group that is capable of reacting with an epoxy group of the mesogenic epoxy monomer.

In a case of synthesizing a specific epoxy compound by using a mesogenic epoxy monomer, the total of the mesogenic epoxy monomer may react to form a specific epoxy compound, or the mesogenic epoxy monomer may partly remain in an unreacted state. From the viewpoint of thermal resistance as described later, the mesogenic epoxy monomer preferably partly remains in an unreacted state.

The specific epoxy compound can be synthesized by using a reaction container, such as a flask in a small scale or a reaction cauldron in a large scale. A specific example of the synthesis method is described below.

A mesogenic epoxy monomer is placed in a reaction container and a solvent is added as necessary, and the epoxy monomer is dissolved by heating the reaction container to a reaction temperature with an oil bath or a heating medium. Then, a biphenyl compound having a functional group that is capable of reacting with an epoxy group of the mesogenic epoxy monomer is added thereto. After dissolving the compound in the solvent, a reaction catalyst is added as necessary, thereby starting the reaction. Subsequently, the solvent is removed under reduced pressure as necessary, whereby a specific epoxy compound is obtained.

The reaction temperature is not particularly limited, as long as the reaction of a mesogenic epoxy group and a functional group that is capable of reacting with an epoxy group can proceed. For example, the reaction temperature is preferably in a range of from 100° C. to 180° C., more preferably from 100° C. to 150° C. When the reaction temperature is 100° C. or higher, the time for completing the reaction tends to be shortened. When the reaction temperature is 180° C. or less, possibility of causing gelation tends to be reduced.

The ratio of the mesogenic epoxy monomer to the biphenyl compound having a functional group that is capable of reacting with an epoxy group of the mesogenic epoxy monomer is not particularly limited. For example, the ratio may be adjusted to satisfy a ratio of the number of equivalent of epoxy group (A) to the number of equivalent of the functional group that is capable of reacting with an epoxy group (B), represented by A:B, of from 10:10 to 10:0.01. From the viewpoint of fracture toughness and heat resistance of a cured product, the range of A:B is preferably from 10:5 to 10:0.1.

From the viewpoint of ease of handling of an epoxy resin, the range of A:B is preferably from 10:1.6 to 10:3.0, more preferably from 10:1.8 to 10:2.9, further preferably from 10:2.0 to 10:2.8.

The structure of the specific epoxy compound can be determined by, for example, matching a molecular weight of the specific epoxy compound, which is presumed to be obtained by the reaction of the mesogenic epoxy monomer and the biphenyl compound having a functional group that is capable of reacting with an epoxy group of the mesogenic epoxy monomer, with a molecular weight of a target compound obtained by liquid chromatography that is performed by a liquid chromatograph having a UV spectrum detector and a mass spectrum detector.

The liquid chromatography is performed by a gradient method using a column for analysis (for example, LaChrom II C16 from Hitachi, Ltd.) while continuously changing the mixture ratio (by volume) of the eluent in the order of acetonitrile/tetrahydrofuran/10 mmol/1 aqueous ammonium acetate solution=20/5/75, acetonitrile/tetrahydrofuran=80/20 (20 min from the start) and acetonitrile/tetrahydrofuran=50/50 (35 min from the start) at a flow rate of 1.0 ml/min. The UV spectrum detector detects an absorbance at a wavelength of 280 nm and the mass spectrum detector detects an ionization voltage as 2700 V.

The weight-average molecular weight (Mw) of the epoxy resin is not particularly limited. From the viewpoint of lowering the viscosity, the weight-average molecular weight (Mw) of the epoxy resin is preferably within a range of from 800 to 1300.

In the disclosure, the number-average molecular weight (Mn) and the weight-average molecular weight (Mw) of the epoxy resin is measured by liquid chromatography.

The liquid chromatography is performed at a sample concentration of 0.5% by mass and a flow rate of 1.0 ml/min, using tetrahydrofuran as a mobile phase. A calibration curve is obtained by using a polystyrene standard sample, and the Mn and Mw (polystyrene-based) are calculated.

The measurement can be performed by using a high performance liquid chromatograph (for example, L6000 from Hitachi, Ltd.) and a data analyzer (for example, C-R4A from Shimadzu Corporation) with GPC columns (for example, G2000HXL and G3000 HXL from Tosoh Corporation).

The epoxy equivalent amount of the epoxy resin is not particularly limited. From the viewpoint of achieving both fluidity of the epoxy resin and thermal conductivity of a cured product thereof, the epoxy equivalent amount is preferably from 245 g/eq to 360 g/eq, more preferably from 250 g/eq to 355 g/eq, further preferably from 260 g/eq to 350 g/eq.

When the epoxy equivalent amount of the epoxy resin is 245 g/eq or more, crystallinity of the epoxy resin is not too high and the fluidity is less likely to be lowered. When the epoxy equivalent amount of the epoxy resin is 360 g/eq or less, the crosslinking density of the epoxy resin is not too low and a high degree of thermal conductivity of a formed product tends to be achieved. In the disclosure, the epoxy equivalent amount of the epoxy resin is measured by perchloric acid titration.

The epoxy resin of the disclosure preferably includes both a specific epoxy compound and a mesogenic epoxy monomer. When a specific epoxy compound and a mesogenic epoxy monomer exist at a suitable proportion in an epoxy resin, a degree of crosslinking density during curing can be increased and a cured product having more suitable thermal resistance can be obtained. The proportion in amount of a specific epoxy compound and a mesogenic epoxy monomer can be adjusted by the amount of a mesogenic epoxy monomer and a biphenyl compound having a functional group that can react with an epoxy group of the mesogenic epoxy monomer, or other reaction conditions.

The proportion of the mesogenic epoxy monomer in the epoxy resin is preferably 50% or less of the total epoxy resin. It has been found that an epoxy resin, in which the proportion of the mesogenic epoxy monomer is 50% or less, is easier to decrease in viscosity as the temperature is increased and exhibits excellent handleability, as compared with an epoxy resin, in which the proportion of the mesogenic epoxy monomer is more than 50%. The reason for this is not exactly clear, but it is presumed that an epoxy resin, in which the proportion of the mesogenic epoxy monomer is 50% or less, is less likely to cause crystal precipitation at a temperature lower than the melting temperature of the epoxy resin.

In the disclosure, the proportion of the epoxy monomer in the epoxy resin can be calculated from a chart obtained by liquid chromatography, for example.

Specifically, the proportion of the mesogenic epoxy monomer is regarded as a proportion of a peak derived from the mesogenic epoxy monomer with respect to the total area of the peaks derived from all components in the epoxy resin, in a chart obtained by liquid chromatography by the following equation. The area of the peaks is determined by detecting an absorbance at a wavelength of 280 nm.

Proportion of area of peak derived from mesogenic epoxy monomer (%)=(area of peak derived from mesogenic epoxy monomer/total area of peaks derived from all components)× 100

The liquid chromatography is performed by using tetrahydrofuran as a mobile phase, at a sample concentration of 0.5% by mass and a flow rate of 1.0 ml/min. The measurement can be performed by using, for example, L6000 from Hitachi, Ltd as a high-speed liquid chromatograph and C-R4A from Shimadzu Corporation as a data analyzer, with GPC columns such as G2000HXL and G3000HXL from Tosoh Corporation.

From the viewpoint of improving the ease of handling, the proportion of the mesogenic epoxy monomer is preferably 50% or less, more preferably 49% or less, further preferably 48% or less, of the total epoxy resin.

From the viewpoint of intrinsic viscosity (melt viscosity), the proportion of the mesogenic epoxy monomer is preferably 35% or more, more preferably 37% or more, further preferably 40% or more, of the total epoxy resin.

<Epoxy Resin Composition>

The epoxy resin composition of the disclosure includes an epoxy resin as described above and a curing agent.

(Curing Agent)

The type of the curing agent included in the epoxy resin composition is not particularly limited, as long as it can cause a curing reaction with an epoxy resin. Specific examples of the curing agent include an amine curing agent, a phenol curing agent, an acid anhydride curing agent, a polymercaptan curing agent, a polyaminoamide curing agent, an isocyanate curing agent, and a block isocyanate curing agent. A single kind of the curing agent may be used alone, or two or more kinds may be used in combination.

From the viewpoint of forming a higher-order structure in a cured product of the epoxy resin composition, a curing agent is preferably an amine curing agent or a phenol curing agent, more preferably an amine curing agent, further preferably an amine compound having at least two amino groups that are directly bonded to an aromatic ring.

Specific examples of the amine curing agent include 3,3'-diaminodiphenylsulfone, 4,4'-diaminodiphenylsulfone, 4,4'-diaminodiphenylmethane, 4,4'-diaminodiphenylether, 4,4'-diamino-3,3'-dimethoxybiphenyl, 4,4'-diaminophenylbenzoate, 1,5-diaminonaphthalene, 1,3-diaminonaphthalene, 1,4-diaminonaphthalene, 1,8-diaminonaphthalene, 1,3-diaminobenzene, 1,4-diaminobenzene, 4,4'-diaminobenzanilide, and trimethylene-bis-4-aminobenzoate.

From the viewpoint of forming a smectic structure in a cured product of the epoxy resin composition, the curing agent is preferably 3,3'-diaminodiphenylsulfone, 4,4'-diaminodiphenylsulfone, 1,3-diaminobenzene, 1,4-diaminobenzene, 4,4'-diaminobenzanilide, 1,5-diaminonaphthalene, 4,4'-diaminodiphenylmethane or trimethylene-bis-4-aminobenzoate. From the viewpoint of obtaining a cured product with low water absorption and high fracture toughness, the curing agent is more preferably 3,3'-diaminodiphenylsulfone.

Examples of the phenol curing agent include a low-molecular phenol compound and a phenol novolac resin, which is obtained by linking low-molecular phenol compounds with a methylene group or the like. Examples of the low-molecular phenol compound include a monofunctional phenol compound, such as phenol, o-cresol, m-cresol and p-cresol; a difunctional phenol compound, such as catechol, resorcinol and hydroquinone; and a trifunctional phenol compound such as 1,2,3-trihydroxybenzene, 1,2,4-trihydroxybenzene and 1,3,5-trihydroxybenzene.

The amount of the curing agent in the epoxy resin composition is not particularly limited. From the viewpoint of efficiency of curing reaction, the amount of the curing agent preferably satisfies a ratio of equivalent amount A of the functional group of the curing agent in the epoxy resin composition with respect to equivalent amount B of the epoxy group of the epoxy resin (AB) of from 0.3 to 3.0, more preferably from 0.5 to 2.0.

(Other Components)

The epoxy resin composition may include components other than the epoxy resin and the curing agent. For example, the epoxy resin composition may include a curing catalyst, a filler or the like. Specific examples of the curing catalyst include the compounds as described above as a reaction catalyst used for the synthesis of the specific epoxy compound.

(Use Application)

The use application of the epoxy resin composition is not particularly limited. For example, the epoxy resin composition can be suitably used for a processing method that requires low viscosity and excellent fluidity. For example, the epoxy resin composition may be used for a process of producing FRPs (Fiber-Reinforced Plastics), in which fibers are impregnated with an epoxy resin composition while heating, or a process of producing a sheet-like product in which an epoxy resin composition is spread with a squeegee or the like while heating.

The epoxy resin composition is also suitably used for a method in which a solvent is desirably not added or reduced in order to suppress formation of voids in a cured product (such as production of FRPs used for aeroplanes or spaceships).

<Epoxy Resin Composition Cured Product and Composite Material>

The epoxy resin cured product of the disclosure is obtained by curing the epoxy resin composition as described above. The composite material of the disclosure includes the epoxy resin cured product and a reinforcing material.

Specific examples of the reinforcing material include carbon material, glass, aromatic polyamide resins such as Kevlar (registered trade name), ultra high molecular weight polyethylene, alumina, boron nitride, aluminum nitride, mica and silicon. The form of the reinforcing material is not particularly limited, and examples thereof include fibers and particles (filler). The composite material may include a single kind of reinforcing material alone, or may include two or more kinds in combination.

EXAMPLES

In the following, the invention is explained by referring to the Examples. However, the invention is not limited to these Examples.

Example 1

To a 500-mL three-necked flask, 50 parts by mass of a mesogenic epoxy monomer having a structure described below were placed, and 100 parts by mass of propyleneglycol monomethyl ether were added. A cooling tube and a nitrogen inlet tube were attached to the flask, and a stirring blade was attached so as to be immersed in the solvent. Then, the flask was immersed in an oil bath at 120° C. and subjected to stirring.

After confirming that the mesogenic epoxy monomer was dissolved and the solution became clear, 4,4'-dihydroxybiphenyl was added as a specific biphenyl compound, such that the ratio of the equivalent amount of epoxy group of the mesogenic epoxy monomer (A) to the equivalent amount of hydroxy group of 4,4'-dihydroxybiphenyl (A:B) was 10:2.5, and 0.5 g of triphenylphosphine were added as a reaction catalyst. The heating of the mixture was continued in an oil bath at 120° C. for 3 hours. Thereafter, propyleneglycol monomethyl ether was evaporated under reduced pressure, and the residue was cooled to room temperature (25° C.). An epoxy resin, in which a part of the mesogenic epoxy monomer is reacted with 4,4'-dihydroxybiphenyl to form a multimer (specific epoxy compound), was thus obtained.

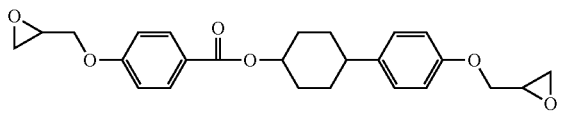 [SMILES: O=C(OC1CCC(c2ccc(OCC3CO3)cc2)CC1)c1ccc(OCC2CO2)cc1]

Subsequently, 50 g of the epoxy resin and 9.1 g of 3,3'-diaminodiphenylsulfone as a curing agent were placed in a stainless dish, and heated on a hot plate at 180° C. After the resin in the stainless dish was melted, the heating was continued at 180° C. for 1 hour. After cooling to room temperature (25° C.), the resin was taken out from the stainless dish and heated in a thermostat chamber at 230° C. for 1 hour to complete the curing, thereby obtaining an epoxy resin cured product. A sample for evaluating fracture toughness having a size of 3.75 mm×7.5 mm×33 mm was prepared from the epoxy resin cured product.

Example 2

To a 500-mL three-necked flask, 50 parts by mass of a mesogenic epoxy monomer having a structure described below were placed, and 100 parts by mass of propyleneglycol monomethyl ether were added. A cooling tube and a nitrogen inlet tube were attached to the flask, and a stirring blade was attached so as to be immersed in the solvent. Then, the flask was immersed in an oil bath at 120° C. and subjected to stirring.

After confirming that the mesogenic epoxy monomer was dissolved and the solution became clear, 2,2'-dihydroxybiphenyl was added as a specific biphenyl compound, such that the ratio of the equivalent amount of epoxy group of the mesogenic epoxy monomer (A) to the equivalent amount of hydroxy group of 2,2'-dihydroxybiphenyl (A:B) was 10:2.5, and 0.5 g of triphenylphosphine were added as a reaction catalyst. The heating of the mixture was continued in an oil bath at 120° C. for 3 hours. Thereafter, propyleneglycol monomethyl ether was evaporated under reduced pressure, and the residue was cooled to room temperature (25° C.). An epoxy resin, in which a part of the mesogenic epoxy monomer is reacted with 2,2'-dihydroxybiphenyl to form a multimer (specific epoxy compound), was thus obtained.

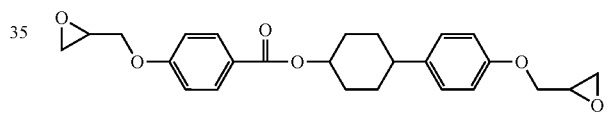

Subsequently, 50 g of the epoxy resin and 9.1 g of 3,3'-diaminodiphenylsulfone as a curing agent were placed in a stainless dish, and heated on a hot plate at 180° C. After the resin in the stainless dish was melted, the heating was continued at 180° C. for 1 hour. After cooling to room temperature (25° C.), the resin was taken out from the stainless dish and heated in a thermostat chamber at 230° C. for 1 hour to complete the curing, thereby obtaining an epoxy resin cured product. A sample was prepared from the epoxy resin cured product in a similar manner to Example 1.

Example 3

To a 500-mL three-necked flask, 50 parts by mass of a mesogenic epoxy monomer having a structure described below were placed, and 100 parts by mass of propyleneglycol monomethyl ether were added. A cooling tube and a nitrogen inlet tube were attached to the flask, and a stirring blade was attached so as to be immersed in the solvent. Then, the flask was immersed in an oil bath at 120° C. and subjected to stirring.

After confirming that the mesogenic epoxy monomer was dissolved and the solution became clear, 4,4'-dihydroxybiphenyl was added as a specific biphenyl compound, such that the ratio of the equivalent amount of epoxy group of the mesogenic epoxy monomer (A) to the equivalent amount of hydroxy group of 4,4'-dihydroxybiphenyl (A:B) was 10:2.5, and 0.5 g of triphenylphosphine were added as a reaction catalyst. The heating of the mixture was continued in an oil bath at 120° C. for 3 hours. Thereafter, propyleneglycol monomethyl ether was evaporated under reduced pressure, and the residue was cooled to room temperature (25° C.). An epoxy resin, in which a part of the mesogenic epoxy monomer is reacted with 4,4'-dihydroxybiphenyl to form a multimer (specific epoxy compound), was thus obtained.

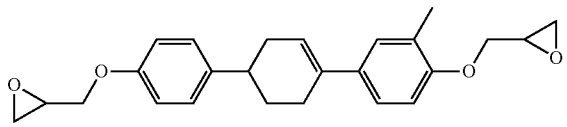

Subsequently, 50 g of the epoxy resin and 9.1 g of 3,3'-diaminodiphenylsulfone as a curing agent were placed in a stainless dish, and heated on a hot plate at 180° C. After the resin in the stainless dish was melted, the heating was continued at 180° C. for 1 hour. After cooling to room temperature (25° C.), the resin was taken out from the stainless dish and heated in a thermostat chamber at 230° C. for 1 hour to complete the curing, thereby obtaining an epoxy resin cured product. A sample was prepared from the epoxy resin cured product in a similar manner to Example 1.

Comparative Example 1

An epoxy resin cured product was prepared in a similar manner to Example 1, except that 50 g of biphenyl-type epoxy resin (YL6121H, Mitsubishi Chemical Corporation) and 19.3 g of 3,3'-diaminodiphenylsulfone as a curing agent were used. A sample was prepared from the epoxy resin cured product in a similar manner to Example 1.

Comparative Example 2

An epoxy resin cured product was prepared in a similar manner to Example 1, except that 50 g of bisphenol A epoxy resin (EPIKOTE 828XA, Mitsubishi Chemical Corporation) and 15.1 g of 3,3'-diaminodiphenylsulfone as a curing agent were used. A sample was prepared from the epoxy resin cured product in a similar manner to Example 1.

Comparative Example 3

An epoxy resin cured product was prepared in a similar manner to Example 1, except that 50 g of a mesogenic epoxy monomer having a structure described below and 13.8 g of 3,3'-diaminodiphenylsulfone as a curing agent were used. A sample was prepared from the epoxy resin cured product in a similar manner to Example 1.

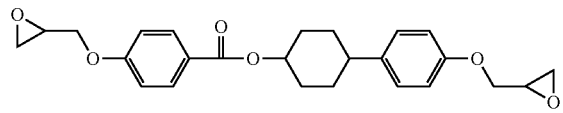

Comparative Example 4

An epoxy resin was prepared in a similar manner to Example 1, except that the mesogenic epoxy monomer was allowed to react with hydroquinone, instead of 4,4'-dihydroxybiphenyl.

An epoxy resin cured product was prepared in a similar manner to Example 1, except that 50 g of the obtained epoxy resin and 9.7 g of 3,3'-diaminodiphenylsulfone as a curing agent were used. A sample was prepared from the epoxy resin cured product in a similar manner to Example 1.

[Evaluation of Viscosity Behavior]

The viscosity behavior of the epoxy resin was evaluated by measuring the dynamic shear viscosity (Pa·s).

The dynamic shear viscosity (Pa·s) was measured with a rheometer (MCR-301 from Anton-Paar GmbH) in an oscillation mode, according to JIS K 7244-10:2005. The measurement was conducted using a parallel plate with a diameter of 12 mm at a frequency of 1 Hz, a gap of 0.2 mm, and a torsion of 2%.

In the measurement, after melting the epoxy resin by heating at 150° C. for over 3 minutes, the temperature of the epoxy resin was decreased from 150° C. to 30° C. at a rate of 2° C./min (temperature decrease step), and then the temperature of the epoxy resin was increased from 30° C. to 150° C. at a rate of 2° C./min (temperature increase step), and a dynamic shear viscosity at 70° C. at the temperature increase step was measured. The results are shown in Table 1.

[Measurement of Fracture Toughness]

As an index for the fracture toughness of the epoxy resin cured product, the fracture toughness (MPa·m$^{1/2}$) of the sample was calculated based on the result of three-point bending test based on ASTM D5045, using a tester (Instron 5948, Instron). The results are shown in Table 1.

[Existence or Non-Existence of Smectic Structure]

In order to determine whether or not a smectic structure is formed in the epoxy resin cured product, an X-ray diffraction measurement was performed using CuKα 1 line, under a tube voltage of 50 kV, a tube current of 30 mA, a scan rate of 1°/min and a measurement range 2θ=2° to 30° using an X-ray diffractometer (Rigaku Corporation). The existence or non-existence of a smectic structure was determined by the following criteria. The results are shown in Table 1.

YES: diffraction peak is observed in a range of 2θ=2° to 10°, and a smectic structure is formed.

NO: diffraction peak is not observed in a range of 2θ=2° to 10°, and a smectic structure is not formed.

TABLE 1

| | Epoxy resin | | Cured product | |
|---|---|---|---|---|
| | Crystal precipitation at 70° C. | Viscosity at 70° C. [Pa·s] | Fracture toughness [MPa·m$^{1/2}$] | Formation of smectic structure |
| Example 1 | NO | 34 | 2.1 | YES |
| Example 2 | NO | 20 | 1.8 | YES |
| Example 3 | NO | 2,390 | 1.8 | YES |
| Comparative Example 1 | YES | 55,000 | 0.9 | NO |
| Comparative Example 2 | NO | 2 | 0.7 | NO |
| Comparative Example 3 | YES | 696,000 | 1.6 | YES |
| Comparative Example 4 | NO | 926 | 1.6 | YES |

As shown in Table 1, the epoxy resins of the Examples, including a specific epoxy compound having a mesogenic structure and a biphenyl group, exhibited a low viscosity at 70° C., indicating favorable handleability. Further, the cured products obtained from the epoxy resins exhibited favorable fracture toughness.

The epoxy resins of Comparative Examples 1 and 3, including an epoxy compound that has a mesogenic structure but not in the form of a specific epoxy compound, were in a crystalline state at 70° C. and the viscosity was high. Further, the cured products obtained from the epoxy resins exhibited lower fracture toughness than the Examples.

In Comparative Example 2, in which an epoxy compound not having a mesogenic structure was used, the viscosity at 70° C. was low but the fracture toughness of the cured product was lower than the Examples.

In Comparative Example 4, in which an epoxy compound having a phenylene group but not having a biphenyl group was used, the viscosity at 70° C. was low but the fracture toughness of the cured product was lower than the Examples.

The invention claimed is:

1. An epoxy resin, comprising an epoxy compound having at least two mesogenic structures and at least one divalent biphenyl group, wherein the at least two mesogenic structures are mesogenic structures represented by the following Formula (3):

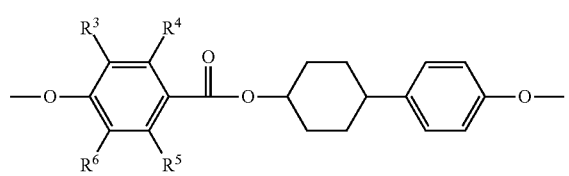

(3)

wherein, in Formula (3), each of $R^3$ to $R^6$ independently represents a hydrogen atom.

2. The epoxy resin according to claim 1, wherein the epoxy compound has a structure in which the divalent biphenyl group is disposed between the at least two mesogenic structures.

3. The epoxy resin according to claim 1, further comprising a mesogenic epoxy monomer represented by the following Formula (1-m):

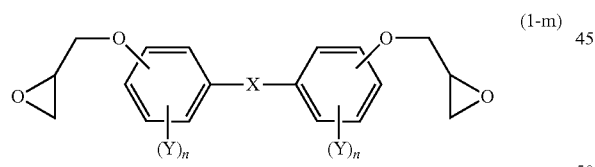

(1-m)

wherein, in Formula (1-m), X represents a single bond or a linking group that includes at least one divalent group selected from the following Group (A):

Group (A)

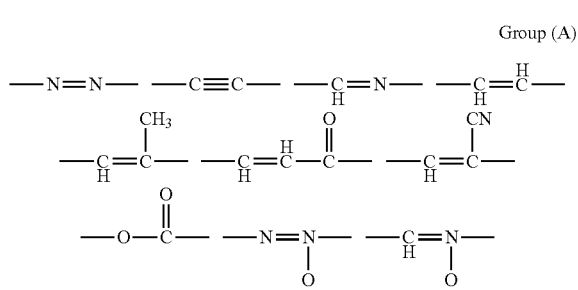

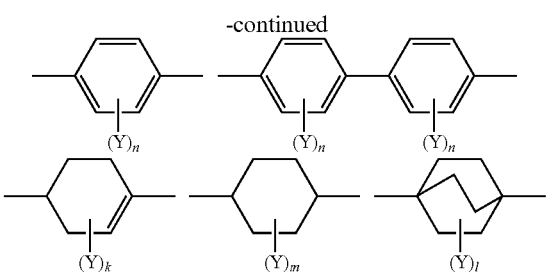

wherein, in Group (A), each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; each n independently represents an integer from 0 to 4; k represents an integer from 0 to 7; m represents an integer from 0 to 8; and l represents an integer from 0 to 12.

4. The epoxy resin according to claim 3, wherein the mesogenic epoxy monomer represented by Formula (1-m) includes a mesogenic epoxy monomer represented by the following Formula (2-m):

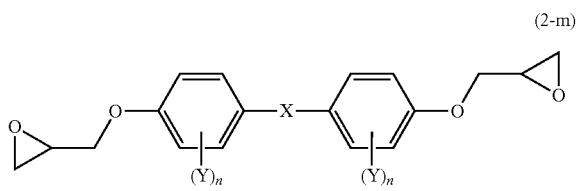

(2-m)

wherein, in Formula (1-m), X represents a single bond or a linking group that includes at least one divalent group selected from the Group (A); each Y independently represents an aliphatic hydrocarbon group having 1 to 8 carbon atoms, an alkoxy group having 1 to 8 carbon atoms, a fluorine atom, a chlorine atom, a bromine atom, an iodine atom, a cyano group, a nitro group or an acetyl group; and each n independently represents an integer from 0 to 4.

5. The epoxy resin according to claim 3, wherein the mesogenic epoxy monomer represented by Formula (1-m) includes a mesogenic epoxy monomer represented by the following Formula (3-m) or Formula (4-m):

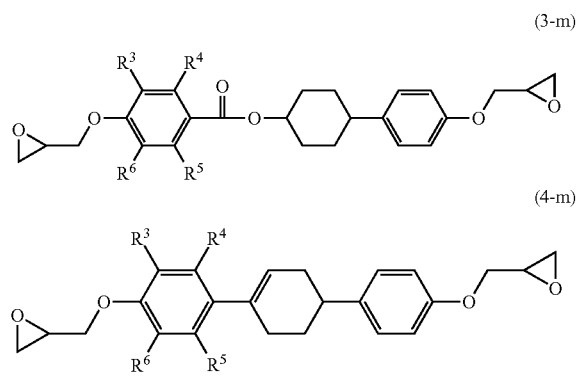

(3-m)

(4-m)

wherein, in Formula (3-m) and Formula (4-m), each of $R^3$ to $R^6$ independently represents a hydrogen atom or an alkyl group of 1 to 3 carbon atoms.

6. The epoxy resin according to claim 3, wherein the mesogenic epoxy monomer is included in an amount of 50% or less with respect to a total amount of the epoxy resin.

7. An epoxy resin composition, comprising the epoxy resin according to claim 1, and a curing agent.

8. The epoxy resin composition according to claim 7, which is configured to form a smectic structure in a cured state.

9. The epoxy resin composition according to claim 7, wherein the curing agent includes a compound having two or more amino groups that are directly bonded to an aromatic ring.

10. The epoxy resin composition according to claim 7, wherein the curing agent is 3,3'-diaminodiphenylsulfone.

11. An epoxy resin cured product, comprising a cured product of the epoxy resin composition according to claim 7.

12. A composite material, comprising the epoxy resin cured product according to claim 11 and a reinforcing material.

13. The composite material according to claim 12, wherein the reinforcing material includes a carbon material.

* * * * *